United States Patent
Moessinger et al.

(10) Patent No.: US 10,010,816 B2
(45) Date of Patent: Jul. 3, 2018

(54) FILTER DEVICE FOR FILTERING A HYDRAULIC FLUID

(71) Applicant: FSP Fluid Systems Partners Holding AG, Baar (CH)

(72) Inventors: Klaus Moessinger, Obersulm (DE); Valentin Pichlmaier, Bretten (DE); Tobias Wendel, Bruchsal (DE)

(73) Assignee: FSP Fluid Systems Partners Holding AG, Baar (CH)

( * ) Notice: Subject to any disclaimer, the term of this patent is extended or adjusted under 35 U.S.C. 154(b) by 500 days.

(21) Appl. No.: 14/630,943

(22) Filed: Feb. 25, 2015

(65) Prior Publication Data

US 2015/0246304 A1    Sep. 3, 2015

(30) Foreign Application Priority Data

Mar. 3, 2014  (DE) .................. 10 2014 102 794

(51) Int. Cl.
*B01D 35/027*  (2006.01)

(52) U.S. Cl.
CPC ....... *B01D 35/027* (2013.01); *B01D 35/0276* (2013.01)

(58) Field of Classification Search
None
See application file for complete search history.

(56) References Cited

U.S. PATENT DOCUMENTS

| | | |
|---|---|---|
| 1,840,312 A | 1/1932 | Dunmire |
| 2,356,947 A | 8/1944 | Pranger et al. |
| 2,969,994 A | 1/1961 | Jacobs et al. |
| 3,227,279 A | 1/1966 | Bokelman |
| 3,557,957 A * | 1/1971 | Baldwin .............. B01D 35/147 210/130 |
| 3,980,805 A | 9/1976 | Lipari |

(Continued)

FOREIGN PATENT DOCUMENTS

| | | |
|---|---|---|
| DE | 1 941 153 | 10/1970 |
| DE | 87 00 021 | 4/1987 |

(Continued)

OTHER PUBLICATIONS

M. Mager, "Filtration in hydraulischen Systemen", pp. 18, 21, 22, 24, 26, 28, 30, 32, 33, Grundlagen, 1998, XP000831894.

(Continued)

*Primary Examiner* — Patrick Orme
(74) *Attorney, Agent, or Firm* — Lipsitz & McAllister, LLC

(57) ABSTRACT

The invention relates to a filter device for filtering a hydraulic fluid comprising a housing having fluid through-openings for hydraulic fluid to be filtered to flow into the housing and for filtered hydraulic fluid to flow out of the housing, and having an assembly opening for inserting a filter element into the housing, the assembly opening being closable by a cover. In order to further develop the filter device such that it can be selectively configured in a cost-effective manner as a suction filter, return filter or return-suction filter, it is proposed in accordance with the invention that different filter elements be insertable into the housing, and that different functional modules be insertable into the housing or connectable to the housing.

28 Claims, 6 Drawing Sheets

(56) References Cited

U.S. PATENT DOCUMENTS

| | | | |
|---|---|---|---|
| 3,996,137 A | 12/1976 | Cooper | |
| 4,009,896 A | 3/1977 | Brewer | |
| 4,051,031 A | 9/1977 | Suzuki | |
| 4,090,962 A | 5/1978 | Braukmann | |
| 4,108,775 A | 8/1978 | Wilkes et al. | |
| 4,632,436 A | 12/1986 | Kimura | |
| 4,702,790 A | 10/1987 | Hogh et al. | |
| 5,141,637 A | 8/1992 | Reed et al. | |
| 5,334,309 A | 8/1994 | Huggett et al. | |
| 5,378,363 A | 1/1995 | Christophe et al. | |
| 5,484,466 A | 1/1996 | Brown et al. | |
| 5,560,824 A | 10/1996 | Sann et al. | |
| 5,577,742 A | 11/1996 | Nicholson et al. | |
| 5,632,512 A | 5/1997 | Guitoneau | |
| 5,643,448 A | 7/1997 | Martin et al. | |
| 5,660,726 A * | 8/1997 | Dluzik | B01D 29/21 210/130 |
| 5,718,825 A | 2/1998 | Greive et al. | |
| 5,772,868 A | 6/1998 | Reinhardt | |
| 5,890,750 A | 4/1999 | Channell et al. | |
| 5,902,361 A | 5/1999 | Pomplun et al. | |
| 5,954,448 A | 9/1999 | Shim | |
| 6,050,500 A | 4/2000 | Ensworth | |
| 6,068,763 A | 5/2000 | Goddard | |
| 6,139,739 A | 10/2000 | Hamlin et al. | |
| 6,391,193 B1 | 5/2002 | Luka | |
| 6,500,335 B2 | 12/2002 | Janik et al. | |
| 6,555,000 B2 | 4/2003 | Knight | |
| 6,557,900 B1 | 5/2003 | Austin | |
| 6,605,210 B2 | 8/2003 | Reinhardt | |
| 6,620,316 B1 | 9/2003 | Sakraschinsky et al. | |
| 6,695,891 B2 | 2/2004 | Reid | |
| 6,740,234 B1 | 5/2004 | Williams et al. | |
| 6,808,211 B2 | 10/2004 | Hofmann et al. | |
| 6,843,911 B2 | 1/2005 | Janik et al. | |
| 6,997,486 B2 | 2/2006 | Milhas | |
| 7,022,228 B2 | 4/2006 | Hennes et al. | |
| 7,094,343 B2 | 8/2006 | Moessinger et al. | |
| 7,316,431 B1 | 1/2008 | Broersma | |
| 7,338,093 B2 | 3/2008 | Bilstein et al. | |
| 7,497,479 B2 | 3/2009 | Moessinger | |
| 8,123,938 B2 | 2/2012 | Baumgaertner et al. | |
| 2001/0042709 A1 | 11/2001 | Janik | |
| 2002/0104980 A1 | 8/2002 | Jainek | |
| 2002/0170852 A1 | 11/2002 | Reinhardt | |
| 2003/0010697 A1 | 1/2003 | Sann et al. | |
| 2003/0038073 A1 | 2/2003 | Fall et al. | |
| 2004/0031745 A1 | 2/2004 | Moessinger et al. | |
| 2004/0182777 A1 | 9/2004 | Stankowski et al. | |
| 2006/0091064 A1 | 5/2006 | Brown et al. | |
| 2006/0108800 A1 | 5/2006 | Moessinger | |
| 2009/0200223 A1 | 8/2009 | Baumgaertner et al. | |

FOREIGN PATENT DOCUMENTS

| | | |
|---|---|---|
| DE | 35 38 589 | 5/1987 |
| DE | 37 00 999 | 7/1988 |
| DE | 40 11 913 | 10/1991 |
| DE | 41 24 323 | 1/1993 |
| DE | 42 21 897 | 1/1994 |
| DE | 43 10 234 | 8/1994 |
| DE | 43 22 226 | 1/1995 |
| DE | 295 02 895 | 6/1995 |
| DE | 44 32 095 | 3/1996 |
| DE | 195 11 482 | 10/1996 |
| DE | 195 14 224 | 10/1996 |
| DE | 195 38 883 | 4/1997 |
| DE | 197 18 603 | 11/1997 |
| DE | 297 23 508 | 4/1999 |
| DE | 197 52 376 | 5/1999 |
| DE | 198 26 032 | 12/1999 |
| DE | 100 06 327 | 8/2001 |
| DE | 100 17 679 | 9/2001 |
| DE | 103 13 239 | 9/2004 |
| DE | 10 2005 041 717 | 4/2006 |
| DE | 10 2010 007 248 | 8/2011 |
| EP | 0 375 373 | 6/1990 |
| EP | 0 532 161 | 3/1993 |
| EP | 0 571 286 | 11/1993 |
| EP | 0 662 337 | 7/1995 |
| EP | 0 733 840 | 9/1996 |
| EP | 0 691 876 | 4/1997 |
| EP | 0 917 900 | 5/1999 |
| EP | 0 817 919 | 9/1999 |
| EP | 0 782 673 | 11/1999 |
| EP | 0 783 361 | 3/2000 |
| EP | 1 031 367 | 8/2000 |
| EP | 1 103 752 | 5/2001 |
| EP | 1 199 093 | 4/2002 |
| EP | 1 042 046 | 6/2004 |
| EP | 1 326 693 | 8/2006 |
| EP | 1 242 747 | 5/2007 |
| EP | 1 653 141 | 5/2010 |
| EP | 2 092 970 | 5/2011 |
| FR | 2 291 784 | 6/1976 |
| FR | 2 528 533 | 12/1983 |
| GB | 2 350 656 | 12/2000 |
| WO | WO 97/41939 | 11/1997 |
| WO | WO 00/21640 | 4/2000 |
| WO | WO 00/66930 | 11/2000 |
| WO | WO 01/80967 | 11/2001 |
| WO | WO 02/32543 | 4/2002 |
| WO | WO 2005/061073 | 7/2005 |

OTHER PUBLICATIONS

"Kombinationsfilterelemente für verbesserte Filtration von Hydraulikflüssigkeiten", *Olhydraulik und Pneumatik*, Mainz, Germany, vol. 37, No. 8, pp. 652, 653, XP000413164; Aug. 1993.

"Hydraulic filtration", *Hydraulics and Pneumatics*, Cleveland, USA, Mar. 1978, vol. 31, No. 3, pp. 10-21, XP002007022.

* cited by examiner

FILTER DEVICE FOR FILTERING A HYDRAULIC FLUID

This application claims the benefit of German application number 10 2014 102 794.9 filed on Mar. 3, 2014, which is incorporated herein by reference in its entirety and for all purposes.

BACKGROUND OF THE INVENTION

The invention relates to a filter device for filtering a hydraulic fluid comprising a housing having fluid through-openings for hydraulic fluid to be filtered to flow into the housing and for filtered hydraulic fluid to flow out of the housing, and having an assembly opening for inserting a filter element into the housing, the assembly opening being closable by a cover.

Such filter devices are used in different applications in hydraulic systems, in particular, in automotive machines such as, for example, construction machinery or agricultural machines. In particular, mineral oils for hydraulic systems can be filtered with such filter devices.

Filter devices of the kind mentioned at the outset are configured, in particular, as suction filters, as return filters or as return-suction filters. Suction filters are usually arranged upstream of a pump and are often installed in a storage tank for hydraulic fluid. Hydraulic fluid which is removed from the storage tank can be filtered by means of the suction filters, and the hydraulic fluid can then be supplied to the pump.

Return filters are usually arranged downstream of a hydraulic consumer, for example, a hydraulic cylinder. The hydraulic fluid flowing back into a storage tank can be filtered by means of these. Return filters are often also installed in the storage tank.

Return-suction filters assume the function of a return filter and a suction filter. By means of these, the hydraulic fluid flowing off from a hydraulic consumer can be filtered and then supplied to a pump. If the volumetric flow of the hydraulic fluid flowing off from the hydraulic consumer is greater than the volumetric flow delivered by the pump, i.e., in the case of an oversupply, the excess amount of hydraulic fluid flowing off can be filtered and then fed to a storage tank. If the volumetric flow flowing off from the hydraulic consumer is less than the volumetric flow delivered by the pump, i.e., in the case of an insufficient supply, hydraulic fluid can be taken from the storage tank and added to the filtered hydraulic fluid. To ensure that the filtered hydraulic fluid has a prescribable pressure level in the case of an oversupply, return-suction filters usually comprise a so-called pressurizing valve which only enables a flow connection to the storage tank when a prescribed pressure level is exceeded. Common return-suction filters additionally comprise a suction valve which in the case of an insufficient supply provides a flow connection from the storage tank to the clean side of the filter element.

The object of the present invention is to further develop a filter device of the kind mentioned at the outset such that it can be selectively configured in a cost-effective manner as suction filter, return filter or return-suction filter.

SUMMARY OF THE INVENTION

This object is accomplished in accordance with the invention in a filter device of the generic kind in that different filter elements are insertable into the housing, and in that different functional modules are insertable into the housing or connectable to the housing.

The filter device in accordance with the invention comprises a housing having at least one fluid through-opening for hydraulic fluid to be filtered to flow into the housing and at least one fluid through-opening for filtered hydraulic fluid to flow out of the housing. Different filter elements can be inserted into the housing, and, in addition, if required, at least one functional module can be inserted into the housing, and, if required, at least one functional module can be connected to the housing. This makes it possible to selectively form a suction filter or a return filter by inserting a suitable filter element and by inserting suitable functional modules. If the filter device is to assume the function of a return-suction filter, at least one further fluid through-opening can be made, in particular, molded in the housing. The housing is preferably produced from metal or a plastic material in a casting process, and this further fluid through-opening can be molded during the molding process of the housing. This merely requires insertion of a core or slide, where required, into the mold used for producing the housing. The same tool can be used for producing the housing irrespective of use of the filter device as suction filter, return filter or return-suction filter. The housing can be produced in large numbers and, therefore, cost-effectively.

In an advantageous embodiment of the invention, the housing is produced from a plastic material in an injection molding process and comprises a first housing part and a second housing part connected in one piece to the first housing part, the first housing part having the assembly opening and at least one fluid through-opening, and the second housing part adjoining the side of the first housing part that faces away from the assembly opening and having at least one fluid through-opening at its end that faces away from the first housing part.

It is favorable if at least one fluid through-opening is defined by a pipe connection piece. A hydraulic line, for example, a hydraulic hose, can be easily connected to the pipe connection piece which is connected in one piece to the housing. For connecting the hydraulic line to the pipe connection piece, it is preferable to use a quick coupling system by means of which the hydraulic line can be connected to the pipe connection piece without the use of a special tool. Such quick coupling systems are known to one skilled in the art from the publication EP 1 653 141 B1.

It may be provided that at least one fluid through-opening is defined by a through-hole in a wall of the housing.

It is particularly advantageous if, for use with a return-suction filter, the housing comprises in the region of a bottom wall facing away from the assembly opening a fluid through-opening defined by a pipe connection piece and immediately adjacent thereto at least one fluid through-opening configured as a through-hole.

The fluid through-opening defined by a pipe connection piece on the bottom wall is expediently surrounded in the circumferential direction at least partially by fluid through-openings which are each configured as a through-hole in a wall of the housing.

In an advantageous embodiment of the invention, the housing comprises a plurality of fluid through-openings which, in relation to a longitudinal axis of the housing, are arranged at the same height.

In an advantageous embodiment, the filter device in accordance with the invention comprises a cylindrical filter element with a filter material extending over the circumference of the filter element, the upper end face of the filter material that faces the assembly opening being covered by an upper end cap having a through-opening, and the lower end face of the filter material that faces away from the assembly opening being covered by a lower end cap having a through-opening, the through-opening of the lower end cap being closable by a spring-loaded bypass valve, and a circumferential sealing lip, which separates an untreated area for hydraulic fluid to be filtered from a clean area for filtered hydraulic fluid, being formed on the outer circumference of the upper end cap, the upper end cap being supported via an upper spacer on the cover, and the lower end cap being supported via a lower spacer on a bottom wall of the housing that faces away from the assembly opening. Hydraulic fluid to be filtered can flow through a fluid through-opening into the untreated area of the housing, can then flow through the filter element radially from the outside to the inside and pass into the clean area of the housing and can flow out of the housing through a further fluid through-opening.

If the hydraulic fluid has a very high viscosity, for example, during a cold start, the filter material of the filter element forms a considerable flow resistance. The bypass valve arranged at the lower end cap is provided to avoid damage to the filter material. Via the bypass valve, the hydraulic fluid can bypass the filter material and pass through the through-opening in the lower end cap directly from the untreated area to the clean area of the filter device if the pressure difference between the untreated side and the clean side exceeds a prescribed value.

An upper spacer and a lower spacer are used for fixing the filter element in the housing. The filter element is supported on the cover of the filter device via the upper spacer, and the filter element is supported on the bottom wall of the housing via the lower spacer.

In an advantageous embodiment, the upper spacer is rigidly connected to the upper end cap.

It is particularly advantageous if the upper spacer is connected in one piece to the upper end cap.

The upper spacer is expediently of cage-like configuration and has a large number of through-holes so that the flow of hydraulic fluid within the housing is only slightly affected by the upper spacer.

The lower spacer is expediently rigidly connected to the lower end cap. In particular, it may be provided that the lower spacer is connected in one piece to the lower end cap.

It is particularly advantageous if the filter device comprises a first functional module which is connectable to a fluid through-opening arranged on a bottom wall of the housing facing away from the assembly opening, and which forms a check valve with a closing body spring-elastically prestressed into a closed position for closing the fluid through-opening arranged on the bottom wall, the closing body being held in an open position by the filter element via a coupling part. With the first functional module, it can be ensured in a constructionally simple way that hydraulic fluid can only flow into the housing through the fluid through-opening arranged on the bottom wall of the housing if a filter element is arranged in the housing. An opening force can be exerted on the closing body of the check valve by the filter element via the coupling part, so that the closing body assumes its open position so long as the filter element is positioned in the housing. If the filter element is removed from the housing through the assembly opening, the closing body of the check valve automatically transfers to its closed position, so that no hydraulic fluid can flow into the housing through the fluid through-opening arranged on the bottom wall. This is particularly advantageous when the filter device is installed in a storage tank for hydraulic fluid, and the fluid through-opening arranged on the bottom wall extends into the hydraulic fluid contained in the storage tank and, therefore, assumes a position below the liquid level of the hydraulic fluid.

Use of the first functional module enables the filter device in accordance with the invention to be cost-effectively configured as suction filter which can preferably be installed in horizontal alignment in a storage tank. For this, the housing can comprise a first housing part which is positionable at a tank wall of the storage tank and comprises the assembly opening and at least one fluid through-opening in the form of an inlet, and a second housing part can adjoin the first housing part, the second housing part being insertable into the storage tank through a tank opening and comprising on a bottom wall facing away from the assembly opening a fluid through-opening, defined by a pipe connection piece, in the form of an outlet, to which the first functional module can be connected.

The first functional module is expediently detachably connectable to the housing of the filter device by a quick coupling system without tools. For this, the first functional module can comprise a pipe connection piece which is detachably connectable to a pipe connection piece formed on the housing in the region of the bottom wall by the quick coupling system without tools. Here the pipe connection piece formed on the bottom wall defines the fluid through-opening of the bottom wall.

In an advantageous configuration of the invention, the filter element and the closing body of the check valve are coupled by a plunger formed on the closing body of the check valve.

For acting on the closing body with a spring-elastic restoring force, the closing body of the check valve, in an advantageous configuration of the invention, is connected in one piece to at least one spring element which acts upon the closing body with a closing force.

The check valve expediently comprises two spring elements in the form of leaf springs, which are formed on the closing body and in combination with the closing body and a plunger formed thereon form a one-piece plastic molded part.

In an advantageous configuration of the invention, the filter device comprises a second functional module which forms a sealing plug which is detachably connectable to a pipe connection piece defining a fluid through-opening. A pipe connection piece can be sealed in a fluid-tight manner by means of the second functional module.

The second functional module is expediently detachably connectable to the pipe connection piece defining the fluid through-opening by a quick coupling system without tools.

It is expedient if the filter device in accordance with the invention comprises a third functional module which is insertable into the housing through the assembly opening and has a ring-shaped separating wall for separating an untreated area of the housing from a clean area of the housing, a sealing lip which surrounds an upper end cap of a filter element being sealingly positionable against the inner side of the separating wall, and the separating wall having an orifice which is in flow connection with a fluid through-opening of the housing. The interior of the housing can be divided up into an untreated area for fluid to be filtered and a clean area for filtered fluid by means of the separating wall and the filter element. A first fluid through-opening of the housing can open into the untreated area, and a second fluid through-opening can open via the orifice of the housing into the clean area. In particular, this allows the two fluid through-openings to be arranged at the same height in relation to a longitudinal axis of the housing. Furthermore, the third functional module in combination with the second functional module makes it possible to configure the filter device in accordance with the invention as a suction or return filter which can be installed in a hydraulic line.

For configuration of the filter device in accordance with the invention as a return filter which can be installed in a storage tank, the filter device, in an advantageous embodiment of the invention, comprises a cylindrical filter element with a filter material extending over the circumference of the filter element, the upper end face of the filter material that faces the assembly opening being covered by an upper end cap, and the lower end face of the filter material that faces away from the assembly opening being covered by a lower end cap, the upper end cap having an upper through-opening which is closable by a spring-loaded bypass valve, and the lower end cap having a lower through-opening, and a circumferential sealing lip which with its free end lies tight against the inner side of a wall of the housing being formed on the outer circumference of the lower end cap, the upper end cap being supported via an upper spacer on the cover, and the lower end cap being supported via a lower spacer on the bottom wall of the housing.

In such a configuration of the invention, hydraulic fluid to be filtered can flow into the housing through at least one fluid through-opening arranged adjacent to the assembly opening. Inside the housing, the hydraulic fluid can flow through the filter element radially from the outside to the inside and can then flow filtered out of the housing through the central through-opening of the lower end cap and a fluid through-opening arranged on the bottom wall of the housing facing away from the assembly opening. The interior of the housing is divided up into an untreated area for fluid to be filtered and a clean area for filtered fluid by the sealing lip formed on the lower end cap. Hydraulic fluid to be filtered can be supplied to the untreated area through the at least one fluid through-opening arranged adjacent to the assembly opening, and the filtered fluid can flow out of the clean area through the fluid through-opening arranged on the bottom wall of the housing.

If the hydraulic fluid has a very high viscosity, the filter material exerts a considerable flow resistance on the hydraulic fluid. To avoid damage to the filter material, the highly viscous hydraulic fluid can flow around the filter material by the bypass valve transferring to its open state. In this case, the hydraulic fluid flows through the filter element in the axial direction from the upper end cap to the lower end cap and can then flow unfiltered out of the housing through the fluid through-opening arranged on the bottom wall.

The filter element is fixed in the housing by means of an upper spacer and a lower spacer, via which the filter element is supported on the cover and the bottom wall of the housing, respectively.

It is advantageous if the upper spacer is rigidly connected to the upper end cap. In particular, it may be provided that the upper spacer is connected in one piece to the upper end cap. The upper spacer and the upper end cap may form a one-piece plastic molded part.

To keep an adverse effect on the flow of the hydraulic fluid inside the housing in the region of the upper spacer as low as possible, it is advantageous if the upper spacer is of cage-like configuration and has a large number of through-holes.

The lower spacer is expediently rigidly connected to the lower end cap. In particular, it may be provided that the lower spacer is connected in one piece to the lower end cap. The lower spacer and the lower end cap may, therefore, form a one-piece plastic molded part.

The lower spacer preferably forms a collar protruding axially from the lower end cap. The collar is seated on the bottom wall of the housing, and it surrounds the fluid through-opening arranged on the bottom wall.

In an advantageous configuration of the invention, the filter device comprises a fourth functional module, which is connectable to the fluid through-opening arranged on the bottom wall of the housing and forms a pipe section. The fourth functional module may be configured in the manner of a pipe extension with which a pipe connection piece formed on the bottom wall of the housing can be extended. This has the advantage that the filter device may have a relatively short length during transportation, and for assembly of the filter device in a storage tank, the length of the filter device can be increased by the fourth functional module being connected to a pipe connection piece formed on the bottom wall of the housing.

The fourth functional module is expediently configured as a one-piece plastic molded part.

It is particularly advantageous if the fourth functional module is detachably connectable to the housing of the filter device by a quick coupling system without tools. For this, the fourth functional module may comprise a pipe connection piece which can be fitted by means of the quick coupling system on a pipe connection piece formed on the bottom wall of the housing.

For configuration of the filter device in accordance with the invention as return-suction filter, the filter device, in an advantageous embodiment of the invention, comprises a cylindrical filter element with a filter material extending over the circumference of the filter element, the upper end face of the filter material that faces the assembly opening being covered by an upper end cap having an upper through-opening, and the lower end face of the filter material that faces away from the assembly opening being covered by a lower end cap having a lower through-opening, a circumferential sealing lip which lies tight with its free end against the inner side of the ring-shaped separating wall of the third functional module insertable into the housing through the assembly opening being formed on the outer circumference of the upper end cap, the separating wall separating an untreated area for hydraulic fluid to be filtered from a clean area for filtered hydraulic fluid, at least one first fluid through-opening and at least one second fluid through-opening being arranged adjacent to the assembly opening, the at least one first fluid through-opening opening into the untreated area, and the at least one second fluid through-opening opening into the clean area, the clean area being in flow connection with a fluid through-opening arranged on a bottom wall of the housing that faces away from the assembly opening via the upper and the lower through-openings of the end caps and via an interior of the filter element surrounded by the filter material, and the untreated area being in flow connection with at least one further fluid through-opening formed in the bottom wall or in a side wall region of the housing adjoining the bottom wall via an annular space surrounding the filter element in the circumferential direction.

In such a configuration of the filter device in accordance with the invention, fluid to be filtered can pass through a first fluid through-opening in the housing into the untreated area, subsequently flow through the filter element in the radial direction from the outside to the inside, and then pass through the through-opening in the upper end cap and an orifice in the separating wall to the second fluid through-opening of the housing. The second fluid through-opening is expediently arranged at the same height as the first fluid through-opening in relation to the longitudinal axis of the housing.

If the volumetric flow of the hydraulic fluid flowing through the first fluid through-opening into the housing exceeds the volumetric flow withdrawn from the housing through the second fluid through-opening, the excess volumetric flow can flow out of the housing through the through-opening in the lower end cap and the fluid through-opening arranged on the bottom wall of the housing.

If, however, the volumetric flow flowing into the housing through the first fluid through-opening is less than the volumetric flow required, for example, by a pump at the second fluid through-opening, hydraulic fluid can flow out of a storage tank through the fluid through-opening arranged on the bottom wall into the interior of the filter element and flow out of it through the upper through-opening and the second fluid through-opening.

The third functional module is used for formation of the filter device as return-suction filter. The third functional module comprises a ring-shaped separating wall by means of which the untreated area into which the first fluid through-opening opens can be separated from a clean area into which the second fluid through-opening opens. The filter element extends with its upper end cap and its sealing lip surrounding the upper end cap in the circumferential direction into the ring-shaped separating wall, and the sealing lip lies tight against the inner side of the ring-shaped separating wall. Hydraulic fluid flowing through the filter element radially from the outside to the inside can, therefore, pass through the upper through-opening into the clean area surrounded by the ring-shaped separating wall.

For fixing the filter element in the housing, it is advantageous if the upper end cap is supported via an upper spacer on the cover. The upper spacer may, for example, be configured in the manner of an, in particular, U-shaped bracket which, in addition to its function of maintaining a spacing between the upper end cap and the cover, may carry out the function of a handle by means of which the filter element can be pulled out of the housing after removal of the cover from the assembly opening.

In an advantageous embodiment of the invention, the lower end cap is seated on a bottom wall of the housing, and the lower end cap and the end region of the filter element adjoining the lower end cap separate the fluid through-opening arranged on the bottom wall of the housing from at least one further fluid through-opening formed in the bottom wall or a side wall region of the second housing part adjoining the bottom wall.

In an advantageous configuration of the invention, the filter device comprises a fifth functional module which is connectable to the lower end region of the housing facing away from the assembly opening and comprises a valve assembly with a suction and pressurizing valve device which is connectable to a fluid through-opening arranged on the bottom wall, and with a spring-loaded bypass valve which is connectable to the at least one further fluid through-opening formed in the bottom wall or in the side wall region of the housing adjoining the bottom wall.

If required, via the suction and pressurizing valve device of the fifth functional module, hydraulic fluid can flow out of the interior of the filter element into a storage tank or from the storage tank into the interior of the filter element, and via the bypass valve, hydraulic fluid, if it has a very high viscosity, can, in order to avoid damage to the filter material, flow out of the untreated area via an annular space surrounding the filter material in the circumferential direction and via the at least one further fluid through-opening formed in the bottom wall or a side wall region adjoining it out of the housing, with the bypass valve assuming its open position.

The suction and pressurizing valve device preferably comprises a first closing element prestressed elastically in the direction toward a valve seat, the first closing element having a through-opening which is closable by a second closing element, the opening direction of the second closing element being opposed to the opening direction of the first closing element. A prescribed pressure level can be maintained within the filter element by means of the first closing element. If the pressure in the interior of the filter element exceeds the prescribed pressure level, the first closing element moves against the action of the spring-elastic restoring force in the opening direction, so that hydraulic fluid can flow out of the interior of the filter element. If the filter element has an insufficient supply of hydraulic fluid, hydraulic fluid can flow into the interior of the filter element. For this, the second closing element of the suction and pressurizing valve device transfers to its open position.

The first closing element and expediently also the second closing element are advantageously of plate-shaped configuration.

In an advantageous configuration of the invention, the fifth functional module comprises an outer pipe which is adapted to be fitted on the lower end region of the housing facing away from the assembly opening and via which the at least one further fluid through-opening is connectable to the bypass valve, the outer pipe surrounding an inner pipe via which the fluid through-opening arranged on the bottom wall of the housing is connectable to the suction and pressurizing valve device. Therefore, in order to avoid damage to the filter material, highly viscous hydraulic fluid can pass to the bypass valve via the space between the inner pipe and the outer pipe of the fifth functional module, and through the inner pipe hydraulic fluid can flow, in dependence upon the open and closed state of the suction and pressurizing valve device, out of the interior of the filter element and into the interior of the filter element.

The fifth functional module is preferably detachably connectable to the second housing part by a quick coupling system without tools. As mentioned above, such quick coupling systems are known per se to one skilled in the art from the publication EP 1 653 141 B1.

The following description of advantageous embodiments of the invention serves for a more detailed explanation in conjunction with the drawings.

DETAILED DESCRIPTION OF THE INVENTION

Figure 1:
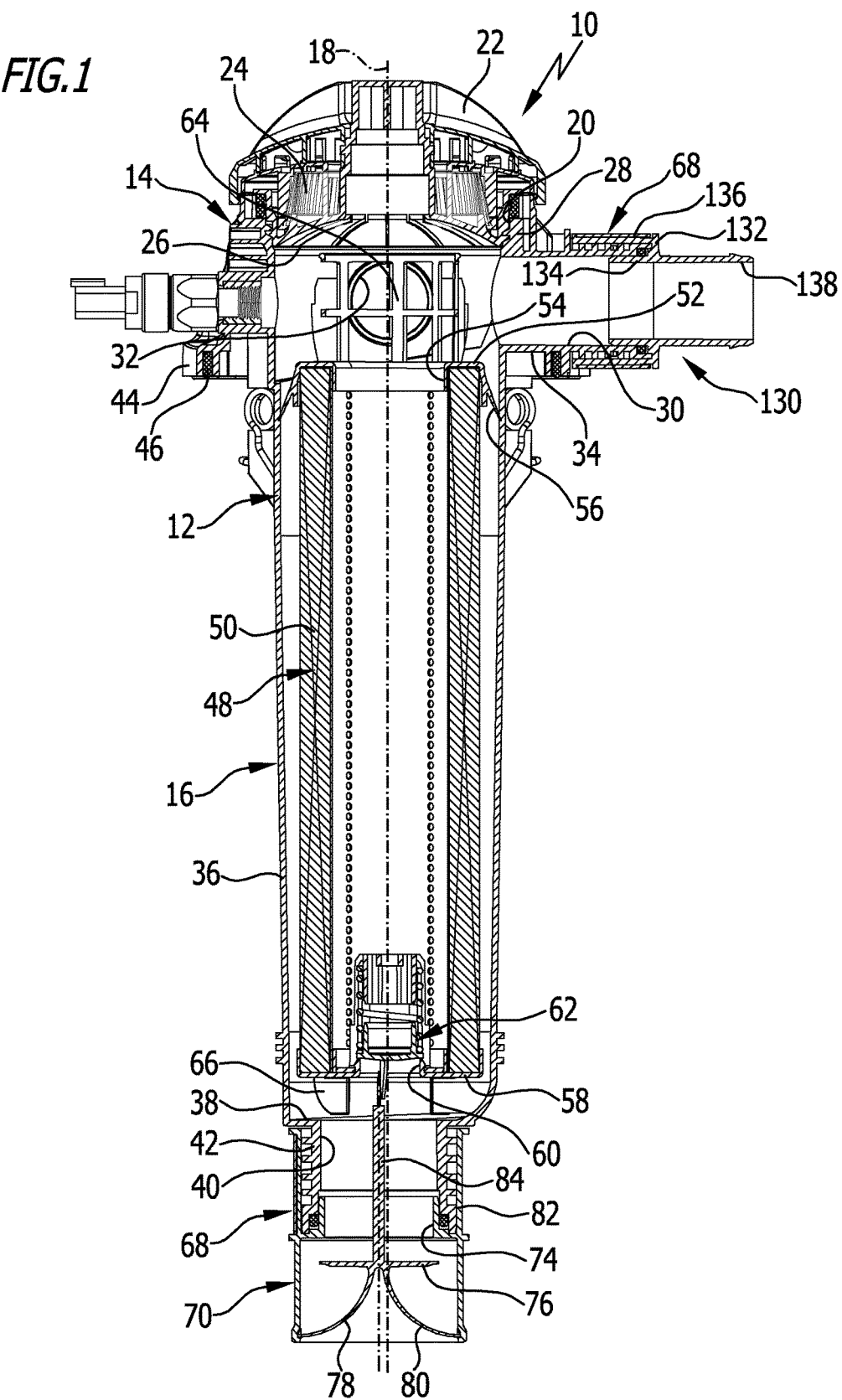
FIG. 1 shows a sectional view of a first advantageous embodiment of a filter device in accordance with the invention in the form of a suction filter which can be installed in a storage tank.

A first advantageous embodiment of a filter device in accordance with the invention, designated in its entirety by reference numeral 10, is schematically illustrated in FIG. 1. The filter device 10 forms a suction filter which can be installed in a storage tank, not shown in the drawings, for hydraulic fluid. The filter device 10 comprises a housing 12 which, in the illustrated embodiment, is produced from a plastic material in an injection molding process and has a first housing part in the form of a housing upper part 14 and a second housing part in the form of a housing lower part 16. The housing lower part 16 is connected in one piece to the housing upper part 14. The housing upper part 14 is of substantially cylindrical configuration, and the housing lower part 16 also has a cylindrical shape. The cylinder axes of the housing upper part 14 and the housing lower part 16 together define a longitudinal axis 18 of the filter device 10.

On its upper side facing away from the housing lower part 16, the housing upper part 14 has an assembly opening 20 which can be sealingly closed by a cover 22. The cover 22 is detachably connected by a screw connection, known per se, to the housing upper part 14. Integrated in the cover 22 is an air filter 24 with which air can be admitted to and removed from the interior of the housing 12. The cover 22 has an arched underside 26 which extends into the housing upper part 14.

The housing upper part 14 has an upper cylinder wall 28 in which a first fluid through-opening 30 and a second fluid through-opening 32 are formed during the production process of the housing 12. The first fluid through-opening 30 is defined by a first pipe connection piece 34 which, in relation to the longitudinal axis 18, is directed radially outwards. In a corresponding manner, the second fluid through-opening 32 is defined by a second pipe connection piece which, in relation to the longitudinal axis 18, is directed radially outwards. The second pipe connection piece is not shown in the drawings.

The two fluid through-openings 30, 32 of the housing upper part 14 are arranged at the same height in relation to the longitudinal axis 18.

The housing lower part 16 has a lower cylinder wall 36 which is connected in one piece to the upper cylinder wall 28. Adjoining the lower cylinder wall 36, on the side facing away from the assembly opening 20, is a bottom wall 38 of the housing lower part 16, which has a third fluid through-opening 40. The third fluid through-opening 40 is defined by a third pipe connection piece 42, which is directed downwards, parallel to the longitudinal axis 18, in the direction facing away from the assembly opening 20.

The housing upper part 14 has a circumferential flange 44 with a ring groove arranged on its underside. A sealing ring 46 in the form of a molded gasket is positioned in the ring groove.

The housing 12 surrounds a cylindrical filter element 48 which, in the usual manner, comprises a filter material 50. The filter material 50 is preferably folded in the shape of a star.

An upper end face of the filter material 50 facing the assembly opening 20 is covered by an upper end cap 52 which has an upper through-opening 54 and on its outer side is connected in one piece to a sealing lip 56 which completely surrounds the upper end cap 52 in the circumferential direction. The sealing lip 56 lies tight against the inner side of the lower cylinder wall 36.

The lower end face of the filter material 50 facing away from the assembly opening 20 is covered by a lower end cap 58 which has a lower through-opening 60. Arranged at the lower through-opening 60 is a spring-loaded bypass valve 62 which opens in the axial direction against the force of a return spring.

The upper end cap 52 is connected in one piece to a cage-like upper spacer 64 which is supported on the cover underside 26 of the cover 22. The lower end cap 58 is connected in one piece to a lower spacer 66 which is supported on the bottom wall 38. The filter element 48 is fixed in the axial direction in the housing 12 by means of the upper spacer 64 and the lower spacer 66.

Figure 2:
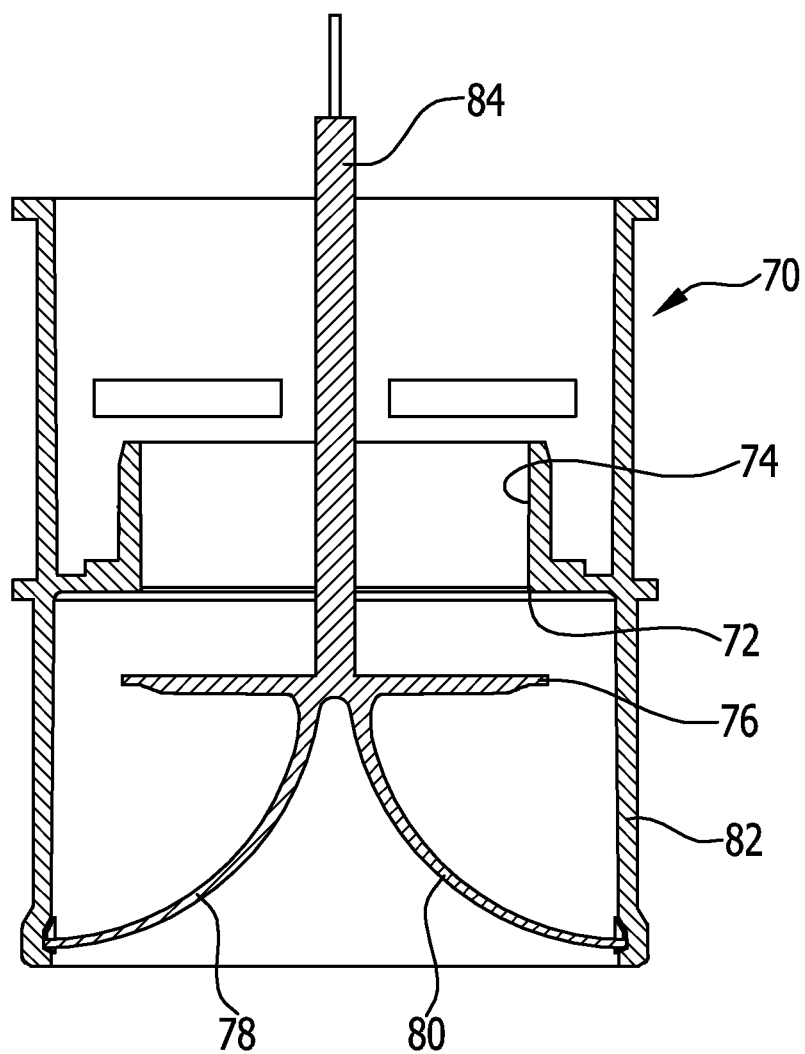
FIG. 2 shows a sectional view of a functional module of the filter device from FIG. 1 in the form of a check valve.

The third pipe connection piece 42 formed on the bottom wall 38 is connected to a first functional module in the form of a check valve 70 by a quick coupling system 68 shown only schematically in the drawings and known per se from the publication EP 1 653 141 B1. The check valve 70 is shown enlarged in FIG. 2. It has a valve seat 72 which surrounds a valve opening 74 and against which a plate-shaped closing body 76 can be sealingly positioned to close the valve opening 74. Formed on the side of the closing body 76 facing away from the valve seat 72 is a spring element which, in the illustrated embodiment, is configured in the form of a first leaf spring 78 and a second leaf spring 80, which are supported at their free ends on a valve housing 82, formed in the manner of a pipe connection piece, of the check valve 70. The closing body 76 is acted upon by the two leaf springs 78, 80 with a closing force directed at the valve seat 72.

Formed on the side of the closing body 76 facing the valve seat 72 is a coupling part in the form of a plunger 84, which lies with its free end against the filter element 48 and thereby holds the closing body 76 against the force of the two leaf springs 78, 80 in an open position spaced from the valve seat 72. If the filter element 48 is removed from the housing 12 through the assembly opening 20, this results in the closing body 76 of the check valve 70 automatically assuming, under the action of the two leaf springs 78, 80, its closed position in which it lies tight against the valve seat 72 and thereby closes the third fluid through-opening 40.

As mentioned above, the filter device 10 forms a suction filter which can be installed in a storage tank for hydraulic fluid. In this case, the housing lower part 16 can be inserted into an opening in the storage tank, and with the sealing ring 46 the housing upper part 14 can be sealingly fitted on an assembly region surrounding the opening in the storage tank. Hydraulic fluid can flow from the storage tank into the housing lower part 16 through the valve opening 74 of the check valve 70 and through the third pipe connection piece 42. The hydraulic fluid can then flow through the filter material 50 in the radial direction from the outside to the inside and can flow out of the housing 12 in the filtered state through the first fluid through-opening 30 and the second fluid through-opening 32. A pump can be connected, in each case, to the first fluid through-opening 30 and the second fluid through-opening 32 by hydraulic lines known per se. Filtered hydraulic fluid can, therefore, be supplied to the pump from the storage tank via the filter device 10.

Figure 3:
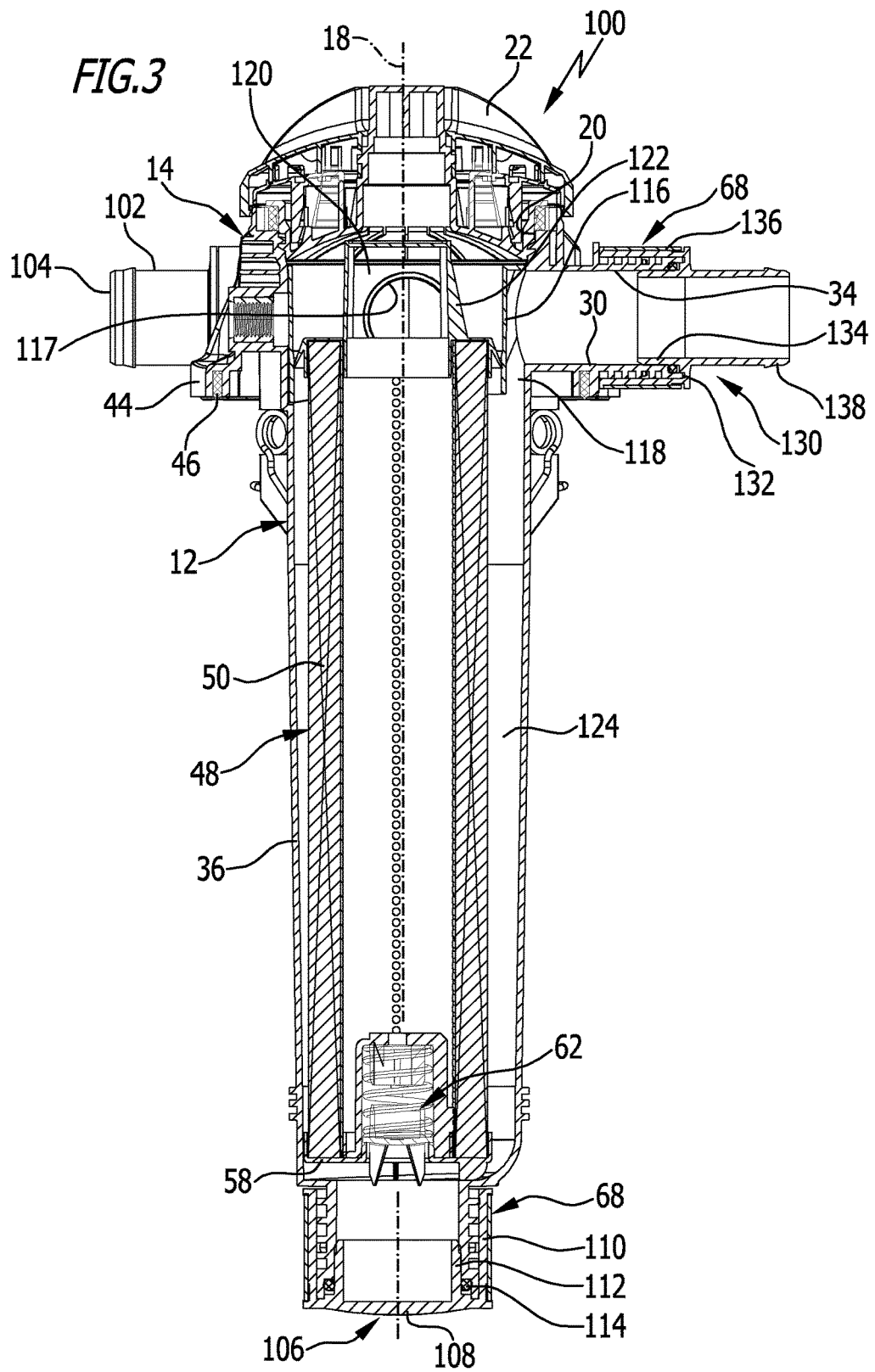
FIG. 3 shows a sectional view of a second advantageous embodiment of a filter device in accordance with the invention in the form of a suction or return filter which can be installed in a hydraulic line.
Figure 4:
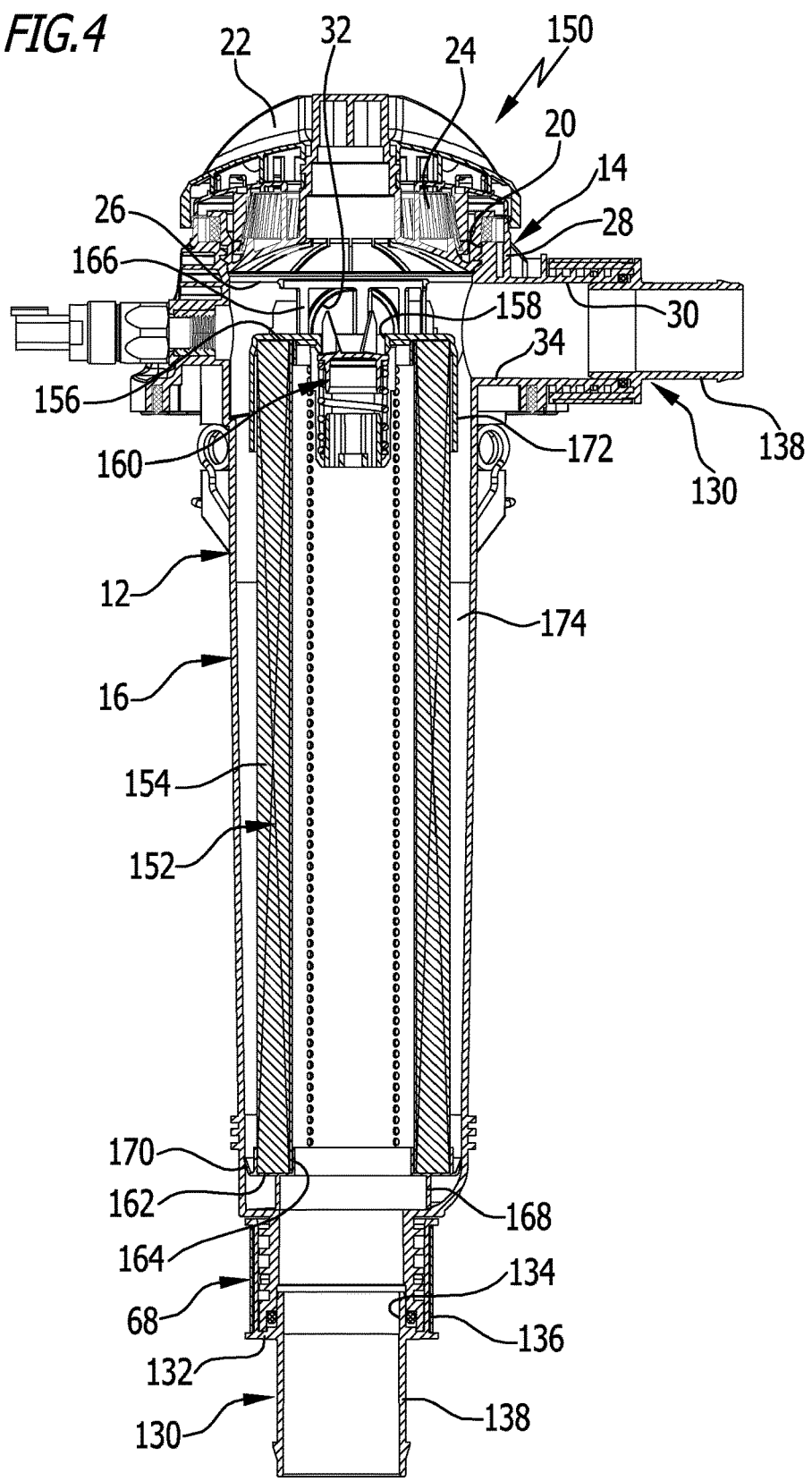
FIG. 4 shows a sectional view of a third advantageous embodiment of a filter device in accordance with the invention in the form of a return filter which can be installed in a storage tank.

The housing 12 may be used not only for a suction filter which can be installed in a storage tank for hydraulic fluid (tank installation filter) but may also be used for a suction filter which is installed in a hydraulic line. This will be clear from FIG. 3, in which a second advantageous embodiment of a filter device in accordance with the invention, denoted in its entirety by reference numeral 100, is schematically shown. The filter device 100 is substantially identical in configuration to the filter device 10 described above with reference to FIG. 1. In FIG. 3 and also in the FIGS. 4 to 6 explained in greater detail below, the same reference numerals are used for identical components as in FIG. 1, and in order to avoid repetitions, reference is to be had to the above explanations in connection with these components.

The filter device 100 forms an in-line filter which may selectively assume the function of a suction filter or a return filter. Here the first fluid through-opening 30 forms an inlet for fluid to be filtered, and the second fluid through-opening 32 forms an outlet for filtered fluid. In the filter device 100, there is connected to the second fluid through-opening 32 an angled pipe section 102, to the free end 104 of which a hydraulic line, in particular, a hydraulic hose, can be connected.

In the filter device 100, the third fluid through-opening 40 arranged on the bottom wall 38 of the housing 12 is tightly sealed by means of a second functional module, which forms a sealing plug 106. In a manner corresponding to that of the check valve 70 explained above with reference to FIGS. 1 and 2, the sealing plug 106 is detachably connected to the third pipe section 42 formed on the bottom wall 38 by a quick coupling system 68 known per se to one skilled in the art. The sealing plug 106 comprises a closing plate 108 on which an outer pipe 110 and an inner pipe 112 are formed. The inner pipe 112 extends into the third pipe connection piece 42 with a sealing ring 114 interposed therebetween, and the outer pipe 110 surrounds the third pipe connection piece 42.

In the filter device 100 there is installed in the housing upper part 14 a third functional module in the form of a ring-shaped separating wall 116, which separates an untreated area 118 for fluid to be filtered from a clean area 120 for filtered fluid. The separating wall 116 is arranged at the level of the first fluid through-opening 30 and the second fluid through-opening 32. The first fluid through-opening 30 opens into the untreated area 118 surrounding the separating wall 116, whereas the second fluid through-opening 32 is in flow connection with the clean area 120 via an orifice 117, aligned with the second fluid through-opening 32, in the separating wall 116.

In the filter device 100, the filter element 48 extends with its upper end region and, in particular, with the upper end cap 52 and the sealing lip 56 surrounding the upper end cap 52 in the circumferential direction into the ring-shaped separating wall 116, with the sealing lip 56 lying tight against the inner side of the separating wall 116. In the filter device 100 shown in FIG. 3, there is formed on the upper end cap 52 a bracket-shaped handle 122 by which the filter element 48 is supported on the cover underside 26 of the cover 22.

As mentioned above, in the filter device 100, the first fluid through-opening 30 forms an inlet for hydraulic fluid to be filtered. The hydraulic fluid is directed by the separating wall 116 into an annular space 124 surrounding the filter element 48 in the circumferential direction and can flow from the annular space 124 through the filter material 50 in the radial direction from the outside to the inside in order to then pass in the filtered state through the upper through-opening 54 and the orifice 117 formed in the separating wall 116 to the second fluid through-opening 32.

If the hydraulic fluid to be filtered has a very high viscosity, the filter material 50 exerts a considerable flow resistance, and in order to avoid damage to the filter material 50, the highly viscous hydraulic fluid can pass into the inner area of the filter element 48 surrounded by the filter material 50 through the through-opening in the lower end cap 58, thereby bypassing the filter material 50, by the bypass valve 62 arranged on the lower through-opening 60 opening.

The filter device 100 may be used as suction filter which is installed in a hydraulic line. For this, a flow connection to a storage tank for hydraulic fluid can be established through the first fluid through-opening 30, and a flow connection to a pump can be established through the second fluid through-opening 32 and the pipe section 102 connected thereto.

The filter device 100 may, however, also be used as return filter which is installed in a hydraulic line. For this, a hydraulic consumer, for example, a hydraulic cylinder, can be connected to the first fluid through-opening 30, and a storage tank for hydraulic fluid can be connected to the second fluid through-opening 32 by means of the pipe section 102.

As mentioned above, the first fluid through-opening 30 of the housing 12 is defined by a first pipe connection piece 34. If required, a fourth functional module in the form of a pipe extension 130 can be connected without tools by means of the quick coupling system 68 known per se to the first pipe connection piece 34 and likewise to the third pipe connection piece 42. The pipe extension 130 has a flange 132 which can be fitted, for example, on the free end of the first pipe connection piece 34, and on which an inner pipe 134 extending into the pipe connection piece 34 and an outer pipe 136 surrounding the pipe connection piece 34 are formed. Adjoining the inner pipe 134 in the direction facing away from the pipe connection piece 34 is a pipe-shaped extension piece 138 which, for example, may be configured in the form of a nipple to which a hydraulic hose can be connected.

The housing 12 may also be used for configuration of a return filter which is installed in a storage tank for hydraulic fluid. In this connection, a third advantageous embodiment of a filter device in accordance with the invention, denoted in its entirety by reference numeral 150, is illustrated schematically in FIG. 4. In the filter device 150, there is inserted in the housing 12 a cylindrical filter element 152 with a filter material 154 whose upper side facing the assembly opening 20 is covered by an upper end cap 156 having an upper through-opening 158. Arranged on the upper through-opening 158 is a spring-loaded bypass valve 160 which is identical in configuration to the bypass valve 62 explained above with reference to FIGS. 1 and 3. The lower end face of the filter material 154 facing away from the assembly opening 20 is covered by a lower end cap 162 having a lower through-opening 164. The filter element 152 is fixed in the axial direction in the housing 12 of the filter device 150 by an upper spacer 166 of cage-like configuration connected in one piece to the upper end cap 156 and by a lower spacer 168 of cage-like configuration connected in one piece to the lower end cap 162. The upper spacer 166 is supported on the cover underside 26 of the cover 22, and the lower spacer 168 is supported on the bottom wall 38.

The lower end cap 162 is connected in one piece to a sealing lip 170 which surrounds the lower end cap 162 in the circumferential direction and in a region adjoining the bottom wall 38 lies tight against the inner side of the lower cylinder wall 36.

The upper end cap 156 is arranged at the level of the first fluid through-opening 30 and the second fluid through-opening 32 and has an outer shell 172 which surrounds in the circumferential direction an end region of the filter material 154 adjoining the upper end face and which extends as far as the region of the housing lower part 16.

Fluid to be filtered can flow into the housing 12 through the first fluid through-opening 30 and through the second fluid through-opening 32 of the filter device 150. The fluid to be filtered is directed by the outer shell 172 of the upper end cap 156 into an annular space 174 which surrounds the filter element 152 in the circumferential direction and from which the hydraulic fluid can flow through the filter material 154 in the radial direction from the outside to the inside. The filtered hydraulic fluid can then flow out of the housing 12 of the filter device 150 through the lower through-opening 164 and the third pipe connection piece 42.

If, for example, when cold-starting a machine, the hydraulic fluid to be filtered has a very high viscosity, the filter material 154 exerts a considerable flow resistance on the hydraulic fluid, and, in order to avoid damage to the filter material 154, the fluid can bypass the filter material 154 by the bypass valve 160 opening the upper through-opening 158 so that the hydraulic fluid can flow through the filter element 152 in the axial direction.

Figure 5:
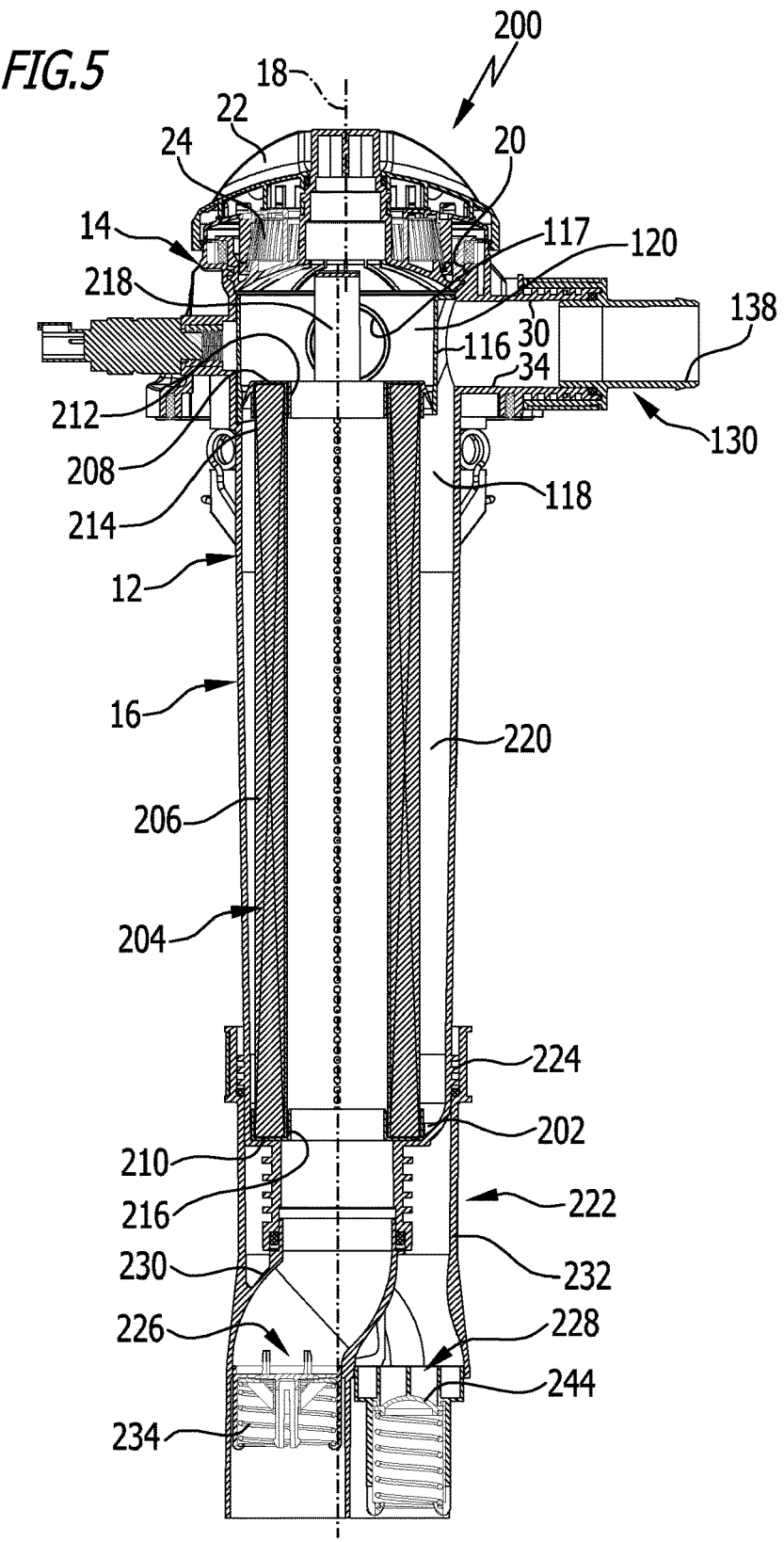
FIG. 5 shows a sectional view of a fourth advantageous embodiment of a filter device in accordance with the invention in the form of a return-suction filter with a functional module in the form of a valve assembly.
Figure 6:
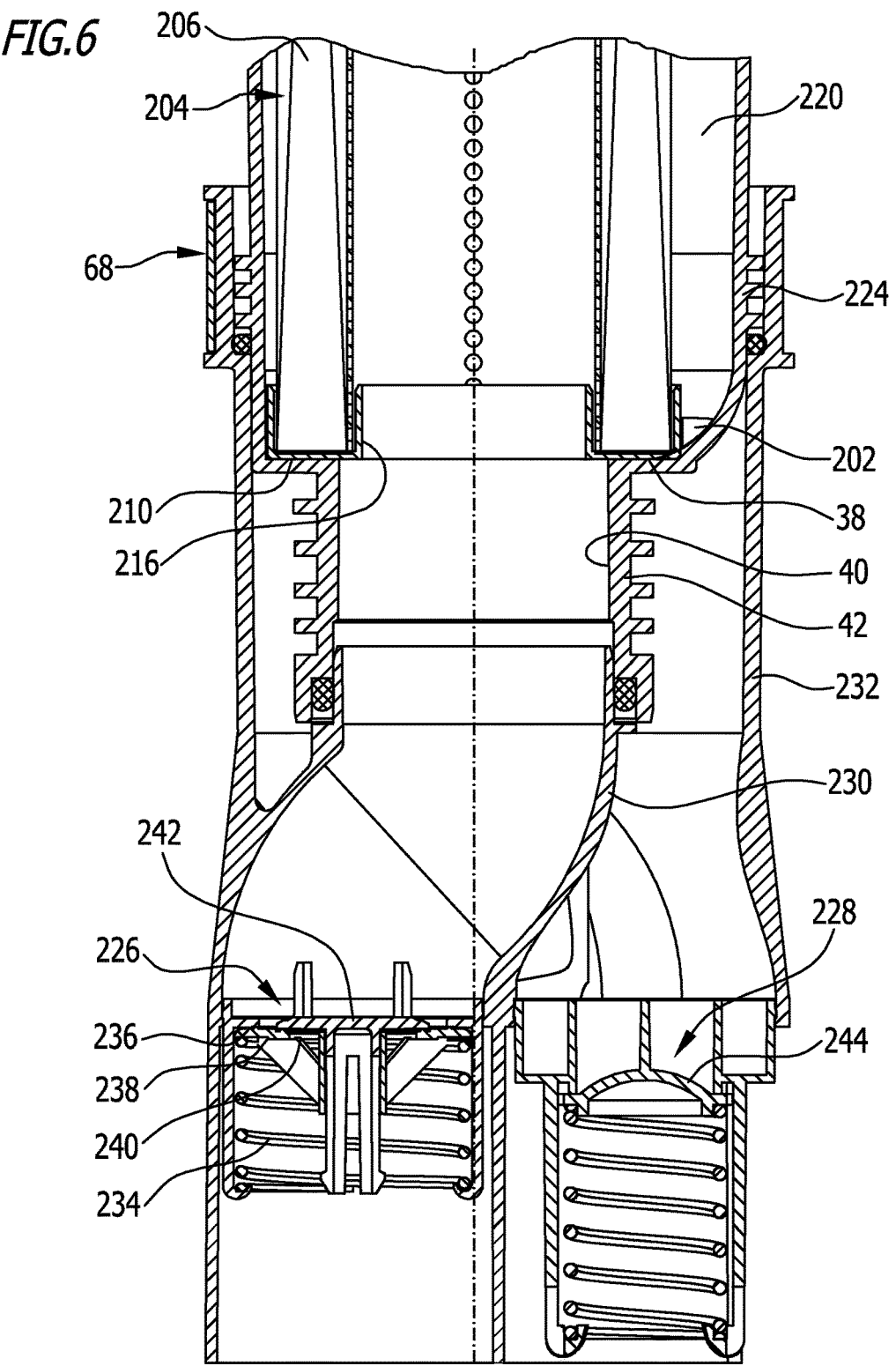
FIG. 6 shows a sectional view of the functional module in the form of a valve assembly connected to the lower region of a housing of the filter device from FIG. 5.

An advantageous fourth embodiment of a filter device 10 in accordance with the invention, denoted in its entirety by reference numeral 200, is illustrated schematically in FIGS. 5 and 6. The filter device 200 forms a return-suction filter with which fluid to be filtered can flow into the housing 12 through the first fluid through-opening 30, and filtered fluid can flow out of the housing 12 through the second fluid through-opening 32. The first fluid through-opening 30 can be connected to a hydraulic consumer and takes up hydraulic fluid flowing off from the hydraulic consumer. A pump can be connected to the second fluid through-opening 32 and takes up hydraulic fluid to be delivered by the pump. If a lower volumetric flow of hydraulic fluid is required by the pump than flows into the housing 12 through the first fluid through-opening 30, excess hydraulic fluid can be transferred to a storage tank through the third fluid through-opening 40 arranged on the bottom wall 38. If a larger volumetric flow of hydraulic fluid is required by the pump than flows into the housing 12 through the first fluid through-opening 30, then hydraulic fluid can flow out of the storage tank into the housing 12 through the third fluid through-opening 40.

In the filter device 200, further fluid through-openings were formed during the production process of the housing 12, in the bottom wall 38, in addition to the third fluid through-opening 40 which is defined by the third pipe connection piece 42. The further fluid through-openings partially surround the third fluid through-opening 40 in the circumferential direction. One of the further fluid through-openings is denoted by reference numeral 202 in FIGS. 5 and 6.

In the filter device 200, a filter element 204 is used with a filter material 206 whose upper end face facing the assembly opening 20 is covered by an upper end cap 208 and whose lower end face facing away from the assembly opening 20 is covered by a lower end cap 210. The upper end cap 208 has an upper through-opening 212 and is surrounded in the circumferential direction by a sealing lip 214 connected in one piece to the upper end cap 208. The lower end cap 210 has a lower through-opening 216 and lies directly against the bottom wall 38 of the housing 12. The upper end cap 208 is supported on the cover underside 26 of the cover 22 via an upper spacer in the form of a bracket-shaped handle 218.

Inserted in the housing upper part 14 of the filter device 200 is a third functional module in the form of a ring-shaped separating wall 116, as described above in greater detail with reference to FIG. 3. The sealing lip 214 of the filter element 204 lies tight against the inner side of the separating wall 116.

In the filter device 200, the third fluid through-opening 40 of the housing 12 is aligned with the third pipe connection piece 42, and the further fluid through-openings 202 surround the lower end region of the filter element 204 facing away from the assembly opening 20 and are aligned with an annular space 220 surrounding the filter element 204 in the circumferential direction.

The filter device 200 has a fifth functional module in the form of a valve assembly 222, which is connected to the lower end region 224 of the housing 12 facing away from the assembly opening 20.

As will be clear, in particular, from FIG. 6, the valve assembly 222 comprises a suction and pressurizing valve device 226 and a bypass valve 228. The suction and pressurizing valve device 226 is connected to the third pipe connection piece 42 by a bent inner pipe 230, and the bypass valve 228 is connected to the further fluid through-openings 202 by an outer pipe 232 surrounding the lower end region 224 of the housing 12 in the circumferential direction.

The suction and pressurizing valve device 226 comprises a plate-shaped first closing element 238 prestressed by a return spring 234 in the direction towards a valve seat 236 and having a central through-opening 240 which is closable by a second plate-shaped closing element 242. The opening direction of the second closing element 242 is opposed to the opening direction of the first closing element 238. In the case of an oversupply of hydraulic fluid to the filter device 200, a prescribable pressure level, for example, a pressure level of 0.5 bar, can be maintained by means of the first closing element 238. Only when the pressure in the interior of the filter element 204 exceeds the prescribed pressure level does the first closing element 238 move against the force of the return spring 234 into its open position in which it opens the third fluid through-opening 40 so that hydraulic fluid can flow out of the filter device 200 through the third fluid through-opening 40 and pass into a storage tank. In the case of an insufficient supply of hydraulic fluid, hydraulic fluid can be drawn in out of the storage tank, with the second closing element 242 transferring to its open position.

The bypass valve 228 comprises in the usual manner a closing body 244 which is spring-loaded in the direction towards a closed position.

The valve assembly 222 is detachably connectable to the housing 12 of the filter device 200 by means of the above-mentioned quick coupling system 68 known per se without tools.

Fluid to be filtered can pass into the housing upper part 14 of the housing 12 through the first fluid through-opening 30. The fluid to be filtered is directed by the separating wall 116 into the annular space 220 which surrounds the filter element 204 in the circumferential direction and from which the hydraulic fluid can flow through the filter material 206 in the radial direction from the outside to the inside. The filtered fluid can then be supplied to a pump through the upper through-opening 212 and the second fluid through-opening 32. In the case of an oversupply, excess hydraulic fluid can be discharged via the suction and pressurizing valve device 226 to a storage tank. In the case of an insufficient supply, hydraulic fluid can be taken from the storage tank and can pass to the lower through-opening 216 via the suction and pressurizing valve device 226 to subsequently flow through the filter element 204 in the axial direction from the bottom to the top and then be discharged to the pump through the upper through-opening 212 and the second fluid through-opening 32.

As is clear from the above, suction filters, return filters and also return-suction filters can be formed by means of the housing 12. Different filter elements can be inserted into the housing 12, and functional modules can be inserted into the housing and connected to the housing in order to cost-effectively achieve the desired filter functions.

The invention claimed is:

1. A filter device for filtering a hydraulic fluid, comprising:
a housing having fluid through-openings for hydraulic fluid to be filtered to flow into the housing and for filtered hydraulic fluid to flow out of the housing, and
an assembly opening for inserting a filter element into the housing, the assembly opening being closable by a cover,
wherein:
different filter elements are insertable into the housing, the different filter elements comprising a sealing lip surrounding an upper end cap in a circumferential direction or comprising a sealing lip surrounding a lower end cap in the circumferential direction,
the housing comprises a first sealing surface and a second sealing surface, wherein, when inserting the filter element comprising the sealing lip surrounding the upper end cap, the sealing lip lies tight against the first sealing surface, and wherein, when inserting the filter element comprising the sealing lip surrounding the lower end cap, the sealing lip lies tight against the second sealing surface, and
different functional modules are insertable into the housing or connectable to the housing.

2. The filter device in accordance with claim 1, wherein:
the housing consists of a plastic material and comprises a first housing part and a second housing part connected in one piece to the first housing part,
the first housing part comprises the assembly opening and at least one of the fluid through-openings, and
the second housing part adjoins a side of the first housing part that faces away from the assembly opening and comprises at least one other of the fluid through-openings at an end that faces away from the first housing part.

3. The filter device in accordance with claim 1, wherein at least one of the fluid through-openings is defined by a pipe connection piece connected in one piece to the housing.

4. The filter device in accordance with claim 1, wherein at least one of the fluid through-openings is defined by a through-hole in a wall of the housing.

5. The filter device in accordance with claim 4, wherein the housing comprises in a region of a bottom wall facing away from the assembly opening one of the fluid through-openings defined by a pipe connection piece and immediately adjacent thereto at least one further of the fluid through-openings configured as a through-hole.

6. The filter device in accordance with claim 5, wherein the fluid through-opening defined by a pipe connection piece on the bottom wall is surrounded in a circumferential direction at least partially by further of the fluid through-openings which are each configured as a through-hole in a wall of the housing.

7. The filter device in accordance with claim 1, wherein the housing comprises a plurality of the fluid through-openings which, in relation to a longitudinal axis of the housing, are arranged at a same height.

8. The filter device in accordance with claim 1, further comprising a cylindrical filter element which comprises one of the different filter elements and which further comprises:
a filter material extending over a circumference of the filter element, an upper end face of the filter material that faces the assembly opening being covered by the upper end cap having a through-opening, and a lower end face of the filter material that faces away from the assembly opening being covered by the lower end cap having a through-opening, the through-opening of the lower end cap being closable by a spring-loaded bypass valve, and
the sealing lip surrounding the upper end cap, which separates an untreated area for hydraulic fluid to be filtered from a clean area for filtered hydraulic fluid, the sealing lip comprising a circumferential sealing lip formed on an outer circumference of the upper end cap, the upper end cap being supported via an upper spacer on the cover, and the lower end cap being supported via a lower spacer on a bottom wall of the housing that faces away from the assembly opening.

9. The filter device in accordance with claim 8, wherein the upper spacer is connected in one piece to the upper end cap.

10. The filter device in accordance with claim 8, wherein the lower spacer is connected in one piece to the lower end cap.

11. The filter device in accordance with claim 1, further comprising a first functional module which is connectable to one of the fluid through-openings arranged on a bottom wall of the housing facing away from the assembly opening, and which forms a check valve with a closing body spring-elastically prestressed into a closed position for closing the fluid through-opening arranged on the bottom wall of the housing facing away from the assembly opening, the closing body being held in an open position by the filter element via a coupling part.

12. The filter device in accordance with claim 11, wherein the first functional module is detachably connectable to the housing by a quick coupling system without tools.

13. The filter device in accordance with claim 11, wherein the closing body is connected in one piece to at least one spring element which acts upon the closing body with a closing force.

14. The filter device in accordance with claim 1, further comprising a second functional module which forms a sealing plug which is detachably connectable to a pipe connection piece defining one of the fluid through-openings.

15. The filter device in accordance with claim 14, wherein the second functional module is detachably connectable to the pipe connection piece defining the fluid through-opening by a quick coupling system without tools.

16. The filter device in accordance with claim 1, further comprising a third functional module which is insertable into the housing though the assembly opening and has a ring-shaped separating wall for separating an untreated area of the housing for hydraulic fluid to be filtered from a clean area of the housing for filtered fluid, the sealing lip which surrounds the upper end cap of the filter element being sealingly positionable against an inner side of the ring-shaped separating wall, and the ring-shaped separating wall having an orifice which is in flow connection with one of the fluid through-openings of the housing.

17. The filter device in accordance with claim 16, further comprising a second functional module which forms a sealing plug which is detachably connectable to a pipe connection piece defining one of the fluid through-openings,
wherein the filter device is configured as a suction or a return filter adapted to be installed in a hydraulic line.

18. The filter device in accordance with claim 1, further comprising a cylindrical filter element with which comprises one of the different filter elements and which further comprises:
a filter material extending over a circumference of the filter element, an upper end face of the filter material that faces the assembly opening being covered by the upper end cap, and a lower end face of the filter material that faces away from the assembly opening being covered by the lower end cap, the upper end cap having an upper through-opening which is closable by a spring-loaded bypass valve, and the lower end cap having a lower through-opening, and
the sealing lip surrounding the lower end cap, the sealing lip comprising a circumferential sealing lip which lies tight against an inner side of a wall of the housing and which is formed on an outer circumference of the lower end cap, the upper end cap being supported via an upper spacer on the cover, and the lower end cap being supported via a lower spacer on a bottom wall of the housing that faces away from the assembly opening.

19. The filter device in accordance with claim 18, wherein the upper spacer is connected in one piece to the upper end cap.

20. The filter device in accordance with claim 18, wherein the lower spacer is connected in one piece to the lower end cap.

21. The filter device in accordance with claim 1, further comprising a fourth functional module in the form of a pipe extension which is connectable to a pipe connection piece defining one of the fluid through-openings.

22. The filter device in accordance with claim 21, wherein the fourth functional module is detachably connectable to the pipe connection piece formed on the housing by a quick coupling system without tools.

23. The filter device in accordance with claim 1, further comprising a cylindrical filter element which comprises one of the different filter elements and which further comprises:
a filter material extending over a circumference of the filter element, an upper end face of the filter material that faces the assembly opening being covered by the upper end cap having an upper through-opening, and a lower end face of the filter material that faces away from the assembly opening being covered by the lower end cap having a lower through-opening, and
the sealing lip surrounding the upper end cap, the sealing lip comprising a circumferential sealing lip which lies with a free end against an inner side of a ring-shaped separating wall of a third functional module and which is formed on an outer circumference of the upper end cap, the ring-shaped separating wall separating an untreated area for hydraulic fluid to be filtered from a clean area for filtered hydraulic fluid, at least one first fluid through-opening and at least one second fluid through-opening being arranged adjacent to the assembly opening, the at least one first fluid through-opening into the untreated area, and the at least one second fluid through-opening opening into the clean area, the clean area being in flow connection with one of the fluid through-openings arranged on a bottom wall of the housing that faces away from the assembly opening via the upper and the lower through-openings and via an interior surrounded by the filter material, and the untreated area being in flow connection with at least one further of the fluid through-openings formed in a bottom wall or in a side wall region of the housing adjoining the bottom wall via an annular space surrounding the filter element in the circumferential direction.

24. The filter device in accordance with claim 1, further comprising a fifth functional module which is connectable to a lower end region of the housing facing away from the assembly opening and which comprises a valve assembly with a suction and pressurizing valve device which is connectable to one of the fluid through-openings arranged on a bottom wall of the housing, and a spring-loaded bypass valve which is connectable to at least one further of the fluid through-openings formed in the bottom wall or in a side wall region of the housing adjoining the bottom wall.

25. The filter device in accordance with claim 24, wherein the suction and pressurizing valve device comprises a first closing element prestressed elastically in a direction toward a valve seat, the first closing element having a through-opening which is closable by a second closing element, an opening direction of the second closing element being opposed to an opening direction of the first closing element.

26. The filter device in accordance with claim 25, wherein at least one of the first closing element and the second closing element is of plate-shaped configuration.

27. The filter device in accordance with claim 24, wherein the fifth functional module comprises an outer pipe which is adapted to be fitted on the lower end region of the housing facing away from the assembly opening and via which the at least one further of the fluid through-openings is connectable to the bypass valve, the outer pipe surrounding an inner pipe via which the fluid through-opening arranged on the bottom wall of the housing is connectable to the suction and pressurizing valve device.

28. The filter device in accordance with claim 24, wherein the fifth functional module is detachably connectable to the housing by a quick coupling system without tools.

* * * * *

UNITED STATES PATENT AND TRADEMARK OFFICE
CERTIFICATE OF CORRECTION

PATENT NO. : 10,010,816 B2
APPLICATION NO. : 14/630943
DATED : July 3, 2018
INVENTOR(S) : Moessinger et al.

Page 1 of 1

It is certified that error appears in the above-identified patent and that said Letters Patent is hereby corrected as shown below:

In the Claims

Column 17, Line 6: "comprising a cylindrical filter element with which comprises" should read
-- comprising a cylindrical filter element which comprises --

Signed and Sealed this
Twenty-fifth Day of September, 2018

Andrei Iancu
*Director of the United States Patent and Trademark Office*